(12) United States Patent  (10) Patent No.: US 8,324,640 B2
Jacob et al.  (45) Date of Patent: Dec. 4, 2012

(54) LED-BASED EDGE LIT ILLUMINATION SYSTEM

(75) Inventors: Cherian Jacob, Brecksville, OH (US); Chen-Lun Hsing Chen, Taipei (TW); Emil Radkov, Euclid, OH (US); Alok Mani Srivastava, Niskayuna, NY (US); Anant Achyut Setlur, Niskayuna, NY (US); Holly Ann Comanzo, Niskayuna, NY (US); Joseph Shiang, Niskayuna, NY (US)

(73) Assignee: GE Lighting Solutions, LLC, Cleveland, OH (US)

( * ) Notice: Subject to any disclaimer, the term of this patent is extended or adjusted under 35 U.S.C. 154(b) by 1856 days.

(21) Appl. No.: 10/884,205

(22) Filed: Jul. 2, 2004

(65) Prior Publication Data

US 2006/0001036 A1  Jan. 5, 2006

(51) Int. Cl.
  *H01L 33/00* (2010.01)
(52) U.S. Cl. .................. 257/98; 257/102; 257/103
(58) Field of Classification Search ............... 362/31, 362/600–634; 345/61–65, 70, 71; 257/98, 257/102, 103
  See application file for complete search history.

(56) References Cited

U.S. PATENT DOCUMENTS

| | | |
|---|---|---|
| 4,630,895 A | 12/1986 | Abdala, Jr. et al. |
| 5,046,829 A | 9/1991 | Worp |
| 5,349,503 A | 9/1994 | Blonder et al. |
| 5,748,270 A | 5/1998 | Smith |
| 5,815,228 A | 9/1998 | Flynn |
| 5,852,483 A | 12/1998 | Newstead et al. |
| 6,151,089 A | 11/2000 | Yang et al. |
| 6,285,423 B1 | 9/2001 | Li et al. |
| 6,297,864 B1 | 10/2001 | Kaneko et al. |
| 6,388,722 B1 | 5/2002 | Yoshii et al. |
| 6,447,135 B1 | 9/2002 | Wortman et al. |
| 6,485,157 B2 | 11/2002 | Ohkawa |
| 6,522,373 B1 | 2/2003 | Hira et al. |
| 6,547,400 B1 | 4/2003 | Yokoyama |
| 6,629,764 B1 | 10/2003 | Uehara |
| 6,637,905 B1 | 10/2003 | Ng et al. |
| 6,655,825 B2 | 12/2003 | Muthu et al. |
| 6,672,734 B2 | 1/2004 | Lammers |
| 6,678,021 B2 | 1/2004 | Ohkawa |
| 6,752,507 B2 * | 6/2004 | Wang et al. .................. 362/619 |
| 6,871,972 B2 * | 3/2005 | Ju ................................ 362/26 |
| 7,123,796 B2 * | 10/2006 | Steckl et al. .................. 385/40 |
| 2003/0067008 A1 * | 4/2003 | Srivastava et al. ............. 257/79 |
| 2004/0008504 A1 * | 1/2004 | Wang et al. .................... 362/31 |
| 2004/0100788 A1 * | 5/2004 | Ju ................................ 362/31 |
| 2004/0141700 A1 * | 7/2004 | Yang ............................ 385/120 |

\* cited by examiner

*Primary Examiner* — Ori Nadav

(74) *Attorney, Agent, or Firm* — Fay Sharpe LLP

(57) ABSTRACT

An edge lit illumination system is directed to providing backlighting utilizing a luminescent impregnated lightguide. The apparatus includes an LED radiation source providing a first radiation and a lightguide optically coupled to the LED radiation source including a luminescent material embedded or coated on an output surface of the lightguide designed to absorb the first radiation, and emit one or more radiations. The illumination system may further include additional optical components such as reflective layers, for directing radiation striking the back surfaces of the light guide back into the lightguide, as well as diffusion layers, UV reflectors, and polarizers.

18 Claims, 3 Drawing Sheets

LED-BASED EDGE LIT ILLUMINATION SYSTEM

FIELD OF THE INVENTION

The present exemplary embodiments relate to an improved backlighting system. It finds particular application in conjunction with liquid crystal displays ("LCD's"), and will be described with particular reference thereto. However, it is to be appreciated that the present exemplary embodiment is also amenable to other like applications wherein a waveguide is used to shine light on a surface.

BACKGROUND OF THE INVENTION

Backlit display devices, such as liquid crystal display (LCD) devices, commonly use a slab or wedge-shaped lightguide. The lightguide distributes light from a substantially linear source, such as a cold cathode fluorescent lamp (CCFL), to a substantially planar output. The planar light output of the lightguide is used to illuminate the LCD.

As is well known, the purpose of the lightguide is to provide for the distribution of light from the light source over an area much larger than the light source, and more particularly, substantially over an entire output surface area of the lightguide. In slab, wedge and pseudo-wedge lightguides, light typically enters the lightguide along an edge surface and propagates between a back surface and the output surface from the edge surface toward an opposing end surface of the lightguide by total internal reflection (TIR). In slab and certain wedge lightguides, the back surface includes structures, e.g., dots in a pattern, facets, etc. A light ray encountering one of these structures is redirected, i.e., either diffusely or specularly reflected, in such a manner that it is caused to exit the output surface. In other wedge lightguides, light is extracted by frustration of the TIR. A ray confined within the lightguide by TIR increases its angle of incidence relative to the plane of the top and bottom wall, due to the wedge angle, with each TIR bounce. The light eventually refracts out of the output surface at a glancing angle thereto, because it is no longer contained by TIR.

More recently, light emitting diodes (LEDs) have been increasingly used as a light source for backlighting applications in LCDs, such as, for example, in conjunction with light guides or light pipes. FIG. 1 details a conventional backlighting device 10 currently in use within the industry. The system 10 includes a light source 12; a light source reflector 14 and a lightguide 16. The light source 12 may be a LED or bank of LEDs that provides light to an input edge surface 18 of the lightguide 16. The light source reflector 14 may be reflective film that wraps around the light source 12 forming a cavity 15. The lightguide 16 may be an optically transmissive monolithic wedge including a back surface 20 and an output surface 22. The lightguide 16 includes an end surface 24 opposing the input edge surface 18. Each of the back surface 20 and the output surface 22 is substantially planar with the back surface converging at the wedge angle toward the output surface. This configuration for the lightguide 16 provides for propagating light from the input edge surface 18 between the back surface 20 and the output surface 22 toward the end surface 24 by TIR and for the extraction of light by frustration of the TIR. An LCD (not shown), is placed over the output surface 22 of the light guide, thereby rendering LCD display legible.

The light guide 16 is optically coupled to the light source 14 and serves to channel the light along its entire length and is designed such that light is reflected up and out of the output surface 22. The color of the backlighting can be modified by changing the light source 12 to a different color, such as by changing the LED or by adding or changing a phosphor material associated with the LED. If a blue illumination is needed, a blue LED is used for the light source 12. Likewise, a red LED is used if red illumination is needed for the light source.

A type of LED increasingly utilized in backlighting is a white LED device. The white LED device, as the name implies, emits radiation that appears white to an observer. In one example, this is achieved by combining an LED, which emits a blue light, and a phosphor such as cerium activated yttrium aluminum garnet ($Y_3Al_5O_{12}:Ce^{3+}$). The blue LED emits a first radiation typically with peak wavelength of 450 to 500 nanometer (nm). The phosphor partially absorbs the blue radiation and reemits a second broadband radiation with peak wavelength of 560 to 580 nm. The combination, also referred to as a composite radiation, of the second yellow radiation together with the unabsorbed first radiation gives a white appearance to the observer. Although offering some advantages, conventional blue chip and yellow phosphor LED based backlighting systems offer limited control over correlated color temperature (CCT), color rendering index (CRI), and color gamut for the display.

In addition, while somewhat effective, conventional LED based backlighting devices place the phosphor onto or immediately adjacent the LED chip in a phosphor layer. Placing the phosphor next to the LED chip has been observed to reduce the conversion efficiency due to phosphor saturation effects, thermal quenching and other optical losses. This can lead to significant reduction in lumen output, reducing the advantages of such backlighting systems. In addition, saturation can lead to severe and undesirable changes in the color point of the device with variations in drive current.

Thus, there is a need for a new LED based backlighting system wherein saturation and other output loss effects are minimized while still maintaining control over CCT, CRI and color gamut for the device.

SUMMARY OF THE INVENTION

In one aspect of the present exemplary embodiments, there is provided an edge lit illumination system including an LED light source; an optically transmissive lightguide having an input surface, a back surface, and an output surface; a radiation conversion material capable of absorbing at least a portion of the radiation at a first wavelength emitted by the LED and emitting a second radiation at a second wavelength; wherein the radiation conversion material is dispersed in the lightguide and/or coated on the output surface of the lightguide.

In another aspect of the invention, there is provided a lightguide for use with an LED light source in an edge lit illumination system, the lightguide including an optically transmissive monolith having an input surface, a back surface, and an output surface; and a radiation conversion material capable of absorbing a first radiation at a first wavelength and emitting a second radiation at a second wavelength; wherein the radiation conversion material is dispersed in the lightguide and/or coated on the output surface of the lightguide.

BRIEF DESCRIPTION OF THE DRAWINGS

The many advantages and features of the present invention will become apparent to one of ordinary skill in the art from the following detailed description of several preferred embodiments of the invention with reference to the attached drawings wherein like reference numerals refer to like elements throughout and in which.

DETAILED DESCRIPTION OF THE PREFERRED EMBODIMENTS

The invention is described in terms of several preferred embodiments, and particularly, in terms of a backlighting system suitable for use in an LCD flat panel display devices, such as a laptop computer display or a desktop flat panel display. The invention, however, is not so limited in application and one of ordinary skill in the art will appreciate that it has application to virtually any edge lit optical system serving as a planar illumination source. Therefore, the embodiments described herein should not be taken as limiting of the broad scope of the invention.

The present exemplary embodiments relate to converting a color output of a light emitting diode (LED) using a fluorescent radiation converting material in a backlighting system where the radiation converting material is placed within various sub-components of the backlight.

Figure 1:
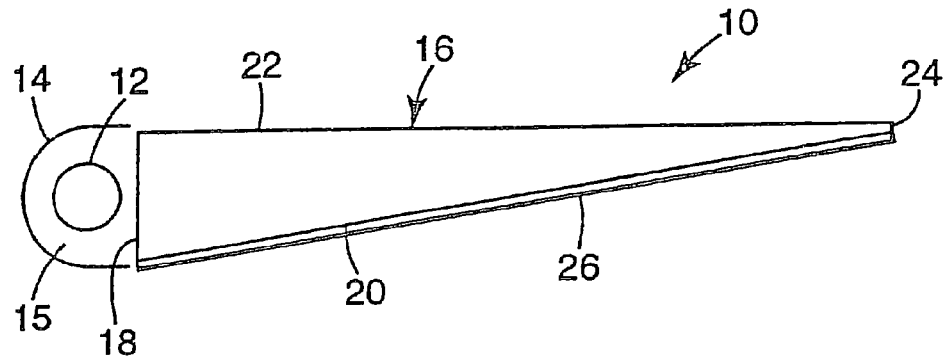
FIG. 1 is a schematic illustration of an illumination device including an LED light source and a wedge lightguide.
Figure 2:
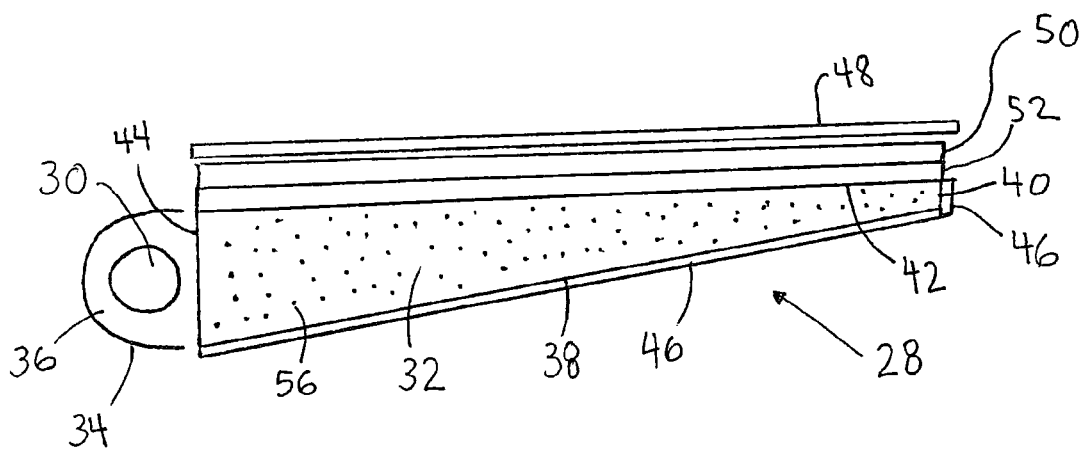
FIG. 2 is a schematic illustration of an illumination device including an LED light source and a light guide with radiation converting material dispersed therein.

FIG. 2 shows a cross sectional view showing a portion of an LED backlighting device in accordance with a first embodiment of the present invention. Backlighting device 28 includes an LED light source 30, a light guide 32, a light source reflector 34 surrounding the LED such that the light generated therefrom is concentrated towards the light guide. The light source reflector 34 may be reflective film that wraps around the LED light source 30 forming a cavity 36.

The LED light source may include any semiconductor visible or UV light source that is capable of producing, when combined with the phosphor composition, white light in the present embodiments. The preferred emission of the LED chip in the present invention will depend on the identity of the phosphors in the disclosed embodiments. However, the emission of the LED will generally have a wavelength in the range from about 250 to about 550 nm, which corresponds to an emission ranging from UV to green. Typically, the semiconductor light source comprises an LED doped with various impurities. Thus, the LED may comprise a semiconductor diode based on any suitable III-V, II-VI or IV-IV semiconductor layers and having an emission wavelength of about 250 to 550 nm. In a preferred embodiment, the LED will emit at a peak wavelength of from about 350 to 500 nm, and preferably from about 350 to 450 nm. Thus, in a preferred embodiment, the LED is a near-UV to violet emitting LED. Exemplary LED chips emitting at 405 and 470 nm (nominal) are known and suitable for use in the present embodiments.

Preferably, the LED may contain at least one semiconductor layer comprising GaN, ZnSe or SiC. For example, the LED may comprise a nitride compound semiconductor represented by the formula $In_iGa_jAl_kN$ (where $0 \leq i$; $0 \leq j$; $0 \leq k$ and $i+j+k=1$) having an emission wavelength greater than about 250 nm and less than about 550 nm. Such LED semiconductors are known in the art. The radiation source is described herein as an LED for convenience. However, as used herein, the term is meant to encompass all semiconductor radiation sources including, e.g., semiconductor laser diodes.

Although the general discussion of the exemplary structures of the invention discussed herein are directed toward inorganic LED based light sources, it should be understood that the LED chip may be replaced by an organic light emissive structure in combination with a phosphor or other radiation source unless otherwise noted and that any reference to LED chip or semiconductor is merely representative of any appropriate radiation source.

The lightguide 32 may be an optically transmissive monolithic wedge including a back surface 38, an output surface 42 and two side surfaces (not numbered). The lightguide 32 also includes an end surface 40 opposing the input edge surface 44. Although shown as a wedge, it will be appreciated that the lightguide 32 may any shape, including, e.g., a slab or a pseudo-wedge. Each of the back surface 38 and the output surface 42 is preferably substantially planar, with the back surface converging at the wedge angle toward the output surface. This configuration for the lightguide 32 provides for propagating light from the input edge surface 44 between the back surface 38 and the output surface 42 toward the end surface 40 by total internal reflection (TIR) and for the extraction of light by frustration of the TIR.

Preferably, secured to every surface except the input and output surfaces is a high efficiency specular reflective layer 46. These surfaces may include the back surface, the bottom surface, and the side surfaces of the light guide. Preferably the reflective layer 46 is at least 85% reflective, more preferably 95% reflective and most preferably greater than 97% reflective, i.e., less than 3% absorptive losses. Also, the reflective layer 46 preferably remains fully specular as a reflector about an entire expected range of incident angles. In a preferred embodiment, the reflective layer 46 is a mirror film that is directly secured, such as by lamination using an adhesive, to the surfaces. Such reflectors layers are known and may include, e.g., a high reflective visible mirror product available from the Minnesota Mining and Manufacturing (3M) Company of St. Paul, Minn., that is formed of numerous polymeric layers. In a different embodiment, the reflective layer 46 may be a film formed by the vacuum deposition of numerous layers of polymeric material. Such a film would require numerous layers wherein particular layers are arranged to reflect particular light wavelengths. In still another embodiment, the reflective layer may be a reflective tape, such as Mylar or some other material. In yet another embodiment, the reflective layer is a tape member containing a $ZrO_2$ filled silicon layer on the side facing the light guide and $TiO_2$ impregnated polymer with Ag on the side facing away from the light guide.

The lamination of the reflective layer 46 to the surfaces may be accomplished by adhesive bonding using UV cure, pressure sensitive or other suitable adhesives. Alternatively, the reflective layer 46 may be formed on the surfaces using a deposition process, e.g., a metal deposition process, or other methods of laying down reflective surface. Directly securing the reflective layer to the surfaces provides an efficient specular reflector that retains the TIR containment of the light being guided. In addition, directly securing the reflective layer reduces or eliminates losses that occur due to the trapping of light between the coated surfaces and the reflecting surface of the reflective layer 46. The reflective layer further acts as a low loss specular reflector to light reentering the lightguide 32 in recycling, brightness enhanced systems.

A result of directly securing the back reflective layer to the lightguide is that the arrangement is extremely efficient at getting light out of the output surface of the lightguide.

A light diffusion plate 48 may be provided on top of the output surface of the light guide. The light diffusion plate may be formed using a transparent resin sheet dispersed with other material having different refractive index or a transparent sheet having an uneven surface. Such diffusion plates are known in the art. The diffusion plate 48 may be formed integrally with the lightguide 32 by the inclusion of diffusive particles within the body of the lightguide 32, or, preferably, a diffusive film may be directly secured, such as by adhesive bonding, to the output surface 42 of the lightguide.

Additional optional light directing optical components may also be included in the backlighting assembly. These additional light directing optics may include, for example, waveguides, brightness enhancing films, prism, etc. Such light directing optics are known in the art and may be included in the backlighting assembly based on the design.

An optional radiation reflection layer 50 for selectively reflecting radiation having a specific wavelength may also be included in the backlighting assembly. Such reflection layer is especially desirable when the LED light source is a near-UV emitting LED. The emission of appreciable amounts of UV light from the light guide is generally not desirable and does not contribute to the emission intensity in the visible spectrum. The use of a UV reflection layer on top of the light guide will direct any UV light not absorbed by the radiation converting material (discussed below) back into the light guide while allowing radiation of different wavelengths (such as that emitted by the phosphor) to pass. Such radiation reflection layers are known in the art and may include reflective multilayer thin film metal based materials.

In one embodiment, a fluorescent radiation converting material is dispersed into the light guide as phosphor particles 56 and/or disposed as a discrete layer 52 (as shown in FIG. 2) on the output surface thereof. The radiation conversion material can also be placed in other layers, such as in the light diffusion layer 48 or the radiation reflection layer 50 and can also be coated on one or more of the back, side and end surfaces of the light guide. The radiation converting material is designed to absorb the radiation emitted by the LED light source, either in whole or in part, and emit radiation at a different wavelength. The radiation converting material may be any suitable radiation converting material capable of absorbing the radiation emitted by the LED chip and emitting radiation in a desired spectral region. Non-limiting examples of suitable radiation converting materials include particulate phosphor material and organic luminescent materials. Such materials are known in the art. For ease of description, the radiation converting material will be described as a phosphor material hereinafter. However, it should be remembered that the invention is not intended to be so limited.

Suitable phosphor compositions should be chosen based on the emission profile of the LED chosen as the light source for the backlight as well as the desired output characteristics of the backlight. That is, if a UV emitting LED is chosen as the light source, then a phosphor that displays a strong absorption in the UV region should be chosen for efficient conversion. Likewise, phosphors should also be chosen based on the color point and other characteristics desired in the output of the backlight. Thus, for example, if a white light emitting backlight system is desired, the specific phosphor composition should be selected such that the output is white colored.

Non-limiting examples of suitable phosphor compositions include the following, either alone or as a blend with one or more additional phosphor compositions.

Blue:
$(Ba,Sr,Ca)_5(PO_4)_3(Cl,F,Br,OH):Eu^{2+},Mn^{2+}{}_{+1},Sb^{3+}$
$(Ba,Sr,Ca)MgAl_{10}O_{17}:Eu^{2+},Mn^{2+}$
$(Ba,Sr,Ca)BPO_5:Eu^{2+},Mn^{2+}$
$(Sr,Ca)_{10}(PO_4)_6*nB_2O_3:Eu^{2+}$
$2SrO*0.84P_2O_5*0.16B_2O_3:Eu^{2+}$
$Sr_2Si_3O_{8*2}SrCl_2:Eu^{2+}$
$Ba_3MgSi_2O_8:Eu^{2+}$
$Sr_4Al_{14}O_{25}:Eu^{2+}$ (SAE)
$BaAl_8O_{13}:Eu^{2+}$ Blue-Green:
$Sr_4Al_{14}O_{25}:Eu^{2+}$
$BaAl_8O_{13}:Eu^{2+}$
$2SrO-0.84P_2O_{5-0.16}B_2O_3:Eu^{2+}$
$(Ba,Sr,Ca)MgAl_{10}O_{17}:Eu^{2+},Mn^{2+}$
$(Ba,Sr,Ca)_5(PO_4)_3(Cl,F,OH):Eu^{2+},Mn^{2+},Sb^{3+}$ Green:
$(Ba,Sr,Ca)MgAl_{10}O_{17}:Eu^{2+},Mn^{2+}$ (BAMn)
$(Ba,Sr,Ca)Al_2O_4:Eu^{2+}$
$(Y,Gd,Lu,Sc,La)BO_3:Ce^{3+},Tb^{3+}$
$Ca_8Mg(SiO_4)_4Cl_2:Eu^{2+},Mn^{2+}$
$(Ba,Sr,Ca)_2SiO_4:Eu^{2+}$
$(Ba,Sr,Ca)_2(Mg,Zn)Si_2O_7:Eu^{2+}$
$(Sr,Ca,Ba)(Al,Ga,In)_2S_4:Eu^{2+}$
$(Y,Gd,Tb,La,Sm,Pr,Lu)_3(Al,Ga)_5O_{12}:Ce^{3+}$
$(Ca,Sr)_8(Mg,Zn)(SiO_4)_4Cl_2:Eu^{2+},Mn^{2+}$ (CASI)
$Na_2Gd_2B_2O_7:Ce^{3+},Tb^{3+}$
$(Ba,Sr)_2(Ca,Mg,Zn)B_2O_6:K,Ce,Tb$ Yellow-Orange:
$(Sr,Ca,Ba,Mg,Zn)_2P_2O_7:Eu^{2+},Mn^{2+}$ (SPP)
$(Ca,Sr,Ba,Mg)_{10}(PO_4)_6(F,Cl,Br,OH):Eu^{2+},Mn^{2+}$ (HALO)
$(Y,Gd,Tb)_3(Al,Ga,In)_5O_{12}:Ce^{3+}$ Red:
$(Gd,Y,Lu,La)_2O_3:Eu^{3+},Bi^{3+}$
$(Gd,Y,Lu,La)_2O_2S:Eu^{3+},Bi^{3+}$
$(Gd,Y,Lu,La)VO_4:Eu^{3+},Bi^{3+}$
$(Ca,Sr)S:Eu^{2+}$
$SrY_2S_4:Eu^{2+}$
$CaLa_2S_4:Ce^{3+}$
$(Ca,Sr)S:Eu^{2+}$
$3.5MgO*0.5MgF_2*GeO_2:Mn^{4+}$ (MFG)
$(Ba,Sr,Ca)MgP_2O_7:Eu^{2+},Mn^{2+}$
$(Y,Lu)_2WO_6:Eu^{3+}, Mo^{6+}$
$(Ba,Sr,Ca)_xSi_yN_z:Eu^{2+}$ In one preferred embodiment, the phosphor composition is a blend of a red emitting phosphor, a green emitting phosphor, and a blue emitting phosphor, such that the light emitted from the backlight is a white light.

When the phosphor composition includes a blend of two or more phosphors, the ratio of each of the individual phosphors in the phosphor blend may vary depending on the characteristics of the desired light output. The relative proportions of the individual phosphors in the various embodiment phosphor blends may be adjusted such that when their emissions are blended and employed in an backlighting device, there is produced visible light of predetermined x and y values on the CIE chromaticity diagram. As stated, a white light is preferably produced. This white light may, for instance, may possess an x and y value in the range of about 0.25 to about 0.55, and preferably in the range of from about 0.25 to about 0.45. As stated, however, the exact identity and amounts of each phosphor in the phosphor composition can be varied according to the needs of the end user.

In a second embodiment, the phosphor or other radiation converting material is embedded or disposed within or on the surface of one or more of the light directing optics in addition or instead of the light guide. Thus, when present, the phosphor material may be disposed on a diffuser plate, brightness enhancement film, prisms, radiation reflection layer, etc. Alternately, the phosphor can be disposed in or placed on film layers placed on one or more surfaces of the light guide, including the output surface.

Figure 3:
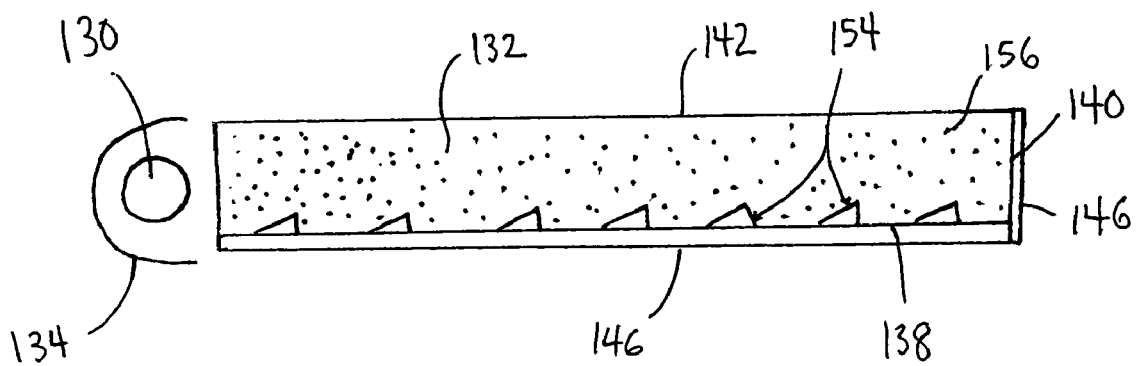
FIG. 3 is a schematic illustration of an illumination device including an LED light source and a light guide with radiation converting material dispersed therein according to an alternate embodiment of the invention.

FIG. 3 shows an alternate embodiment of a backlighting system including a plurality of optical structures 154. With continued reference to FIG. 3, a slab shaped lightguide 132 includes an input edge surface 144, an opposing end surface 140, an output surface 142 and a back surface 138. Phosphor particles 156 are either dispersed in the lightguide (as shown) and/or positioned as a distinct layer (not shown) on the output surface 142 and, optionally, on other surfaces of the light guide. Secured to the back and end surfaces is a reflective layer 146. The lightguide 40 is shown as a slab, and the back surface 48 is formed with a plurality of optical structures 154. This configuration is referred to herein as a pseudo-wedge. The lightguide 132 may be cast to include the optical structures 154 or the optical structures may be formed using suitable microreplication techniques in the back surface 138. The optical structures 154 make the extraction of light from the lightguide more uniform as well as to enhance light dispersion.

Figure 4:
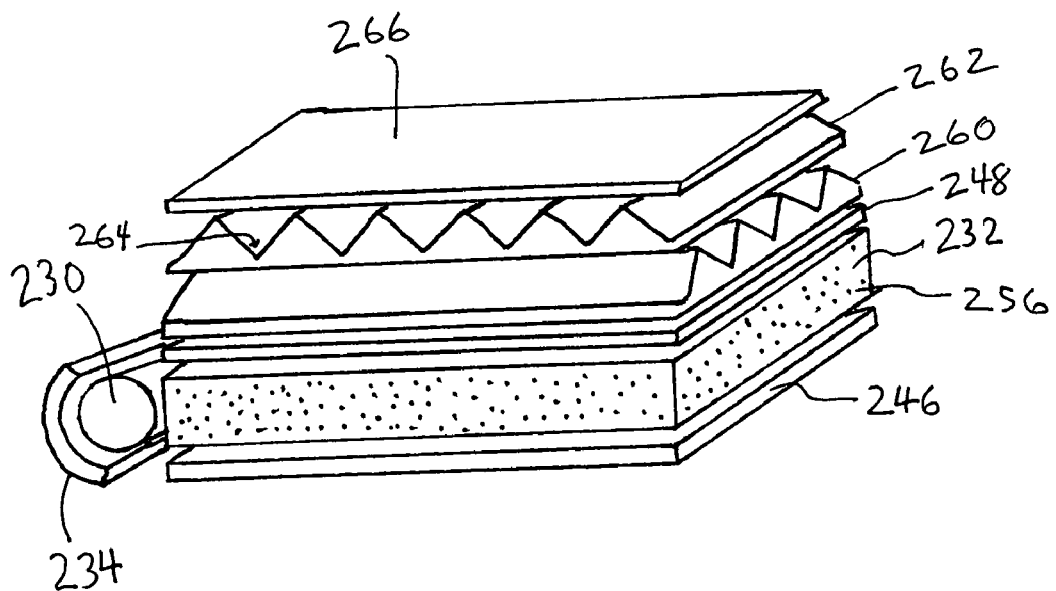
FIG. 4 is a schematic illustration of an illumination device including an LED light source and light directing optics with radiation converting material dispersed therein in accordance with a third embodiment of the invention.

FIG. 4 shows still another embodiment. With reference to FIG. 4, a backlighting unit is shown including an LED light source 230, a reflector 234, a lightguide 232, a reflective layer 246 attached to the back and/or bottom surfaces of the light guide for reflecting UV and visible light back into the light guide, a diffusion plate 248, first and second prisms or other polarizers 260, 262 having a plurality of parallel grooves 264 for polarizing, aligning and concentrating the light emitted from the output surface of the lightguide. A protection sheet 266 made from a durable material transparent to the light emitted by the backlight system is used to protect the other components of the assembly. Phosphor particles 256 may be dispersed in the lightguide (as shown) and/or positioned as a distinct layer (not shown) on the output surface and, optionally, on other surfaces of the light guide or in the other components of the unit, such as the prism, polarizers, etc. When present, the prisms (or other polarizers) as well as the protection sheet may also contain phosphor particles as described above with respect to the other components in the backlight system.

Figure 5:
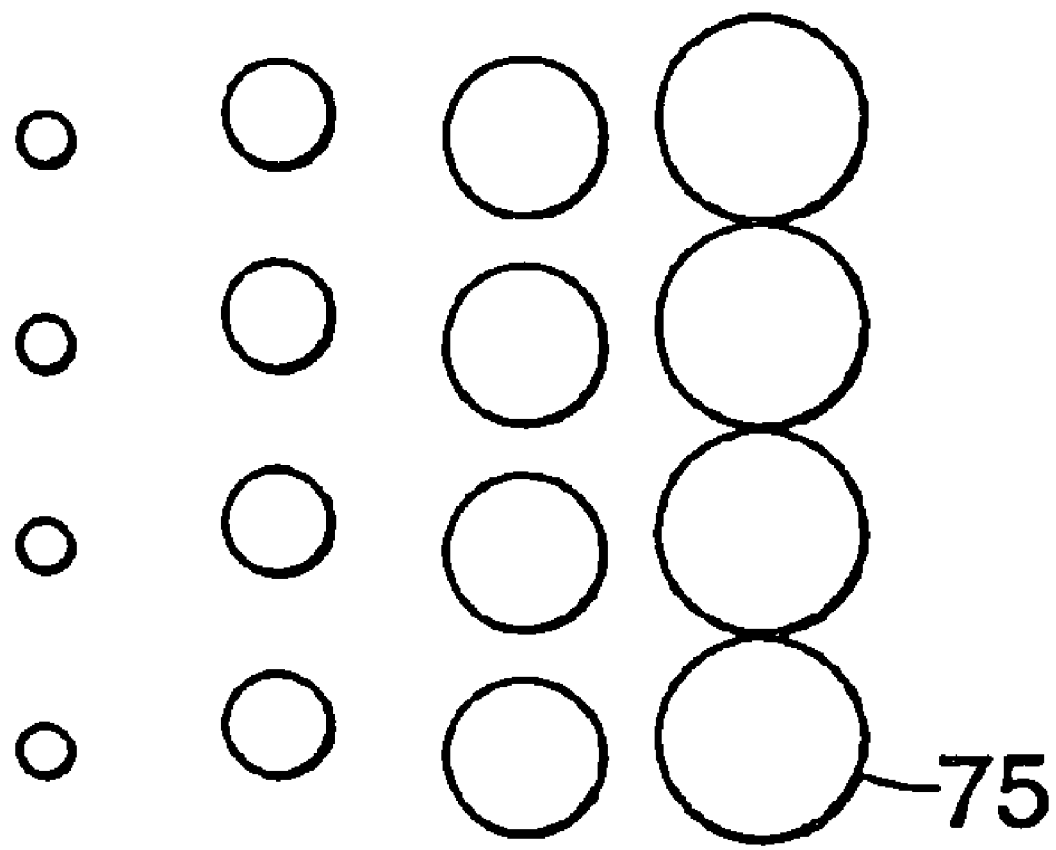
FIG. 5 is a schematic illustration of a pattern suitable for use on a surface of a lightguide in accordance with an embodiment of the invention.

A pattern may be incorporated into the back surface of the light guide to enhance the uniform extraction of light from the lightguide. As shown in FIG. 5, the pattern may take the form of dots 75 formed from an adhesive, which may be used to secure the reflection sheet to the lightguide. The pattern for the adhesive is arranged with a spacing and density chosen to extract light efficiently and uniformly from the lightguide. A light ray from the light source encountering the adhesive is diffusely reflected and extracted from the lightguide. The adhesive pattern may be distributed with an appropriate density and spacing to provide for the uniform extraction of light from the lightguide. The dots may be, for example, from less than 100 microns up to about 1 mm in diameter. Of course patterns including other shapes and other materials may be used.

In the present embodiments, the placement of the phosphor or other radiation conversion materials away form the LED light source reduces saturation effects as well as other optical and thermal losses by reducing the average flux on the phosphor. By coating or covering other surfaces of the light guide except the output surface with a reflection layer, loss of LED light and luminescence from the phosphor material is minimized. When phosphor material is embedded in the lightguide and/or deposited on its output surface, light from the LED can exit from the lightguide after striking phosphor particles. The use of a UV filter prevents UV light from the LED from exiting the lightguide.

When the phosphor material is positioned on the output surface of the lightguide, different color emitting phosphor materials can be patterned to make red, green, and blue pixels for an LCD display or general signage. The ability to form red, green, and blue pixels for an LCD display would eliminate the need for color filters, thereby improving the brightness of the display.

The invention has been described in terms of several preferred embodiments. Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the intention, and the exclusive use of all modifications which come within the scope of the appended claims is reserved.

What is claimed is:

1. An edge lit lighting assembly comprising
an LED light source;
an optically transmissive lightguide having an input surface, a back surface, and an output surface; and
a radiation conversion material capable of absorbing at least a portion of the radiation at a first wavelength emitted by the LED and emitting a second radiation at a second wavelength;
wherein said radiation conversion material is coated on said output surface of said lightguide.

2. An edge lit lighting assembly according to claim 1, wherein said LED light source is a near-UV or violet emitting LED.

3. An edge lit lighting assembly according to claim 2, wherein said LED emits radiation at a wavelength of from about 350 to about 450 nm.

4. An edge lit lighting assembly according to claim 1, wherein said radiation conversion material is a phosphor material.

5. An edge lit lighting assembly according to claim 4, wherein said phosphor material comprises at least two different phosphors.

6. An edge lit lighting assembly according to claim 1, wherein said radiation conversion material emits white light.

7. An edge lit lighting assembly according to claim 1, further comprising a reflective layer secured to said back surface of said lightguide.

8. An edge lit lighting assembly according to claim 1, further comprising a light diffusion plate positioned over said output surface.

9. An edge lit lighting assembly according to claim 8, wherein said radiation converting material is dispersed in or coated on said light diffusion plate.

10. An edge lit lighting assembly according to claim 1, wherein said backlight assembly is suitable for use in an LCD or an illumination panel.

11. An edge lit lighting assembly according to claim 1, wherein said LED comprises a nitride compound semiconductor represented by the formula $In_iGa_jAl_kN$, where $0 \leq i$; $0 \leq j$, $K$, and $i+j+k=1$.

12. An edge lit lighting assembly according to claim 1, wherein said assembly comprises a backlight for an electronic display device.

13. A lightguide for use with an LED light source in an edge lit lighting assembly, said lightguide comprising
a optically transmissive monolith having an input surface, a back surface, and an output surface; and
a radiation conversion material capable of absorbing a first radiation at a first wavelength and emitting a second radiation at a second wavelength;
wherein said radiation conversion material is coated on said output surface of said lightguide.

14. A lightguide according to claim 13, further comprising a reflective layer attached to an outside surface of said lightguide except said input surface and said output surface.

15. A lightguide according to claim 13, wherein said radiation conversions material comprises a phosphor composition.

16. A lightguide according to claim 15, wherein said phosphor composition comprises at least two different phosphors.

17. A lightguide according to claim 13, wherein said radiation conversion material emits white light.

18. An edge lit lighting assembly comprising
an LED light source;
an optically transmissive lightguide having an input surface, a back surface, and an output surface; and
a radiation conversion material capable of absorbing at least a portion of the radiation at a first wavelength emitted by the LED and emitting a second radiation at a second wavelength;
wherein said radiation conversion material is at least one of coated on said output surface of said lightguide, and dispersed in a film on the output and/or back surface of said light guide, and
wherein said phosphor material is selected from the group consisting of: $(Ba,Sr,Ca)_5(PO_4)_3(Cl,F,Br,OH):Eu^{2+},Mn^{2+},Sb^{3+}$; $(Ba,Sr,Ca)MgAl_{10}O_{17}:Eu^{2+},Mn^{2+}$; $(Ba,Sr,Ca)BPO_5:Eu^{2+}$, $Mn^{2+}$; $(Sr,Ca)_{10}(PO_4)_6*nB_2O_3:Eu^{2+}$; $2SrO*0.84P_2O_5*0.16B_2O_3:Eu^{2+}$; $Sr_2Si_3O_{8*2}SrCl_2:Eu^{2+}$; $Ba_3MgSi_2O_8:Eu^{2+}$; $BaAl_8O_{13}:Eu^{2+}$; $Sr_4Al_{14}O_{25}:Eu^{2+}$; $BaAl_8O_{13}:Eu^{2+}$; $2SrO-0.84P_2O_{5-0.16}B_2O_3:Eu^{2+}$; $(Ba,Sr,Ca)_5(PO_4)_3(Cl,F,OH):Eu^{2+},Mn^{2+},Sb^{3+}$; $(Ba,Sr,Ca)MgAl_2O_4:Eu^{2+}$; $(Y,Gd,Lu,Sc,La)BO_3:Ce^{3+},Tb^{3+}$; $(Ba,Sr,Ca)_2SiO_4:Eu^{2+}$; $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_3(Al,Ga)_5O_{12}:Ce^{3+}$; $(Ca,Sr)_8(Mg,Zn)(SiO_4)_4Cl_2:Eu^{2+},Mn^{2+}$; $Na_2Gd_2B_2O_7:Ce^{3+},Tb^{3+}$; $(Ba,Sr)_2(Ca,Mg,Za)B_2O_6:K,Ce,Tb$; $(Sr,Ca,Ba,Mg,Zn)_2P_2O_7:Eu^{2+},Mn^{2+}$; $(Ca,Sr,Ba,Mg)_{10}(PO_4)_6(F,Cl,Br,OH):Eu^{2+},Mn^{2+}$; $(Gd,Y,Lu,La)_2O_3:Eu^{3+},Bi^{3+}$; $(Gd,Y,Lu,La)_2O_2S:Eu^{3+},Bi^{3+}$; $(Gd,Y,Lu,La)VO_4:Eu^{3+},Bi^{3+}$; $SrY_2S_4:Eu^{2+}$; $CaLa_2S_4:Ce^{3+}$; $(Ca,Sr)S:Eu^{2+}$; $3.5MgO*0.5MgF_2*GeO_2:Mn^{4+}$; $(Ba,Sr,Ca)MgP_2O_7:Eu^{2+},Mn^{2+}$; $(Y,Lu)_2WO_6:Eu^{3+}$, $Mo^{6+}$; $(Ba,Sr,Ca)_2Si_yN_z:Eu^{2+}$ and blends thereof.

\* \* \* \* \*